L. VAN GILDER.
WATER METER.
APPLICATION FILED AUG. 10, 1914.
1,146,674.
Patented July 13, 1915.
2 SHEETS—SHEET 1.
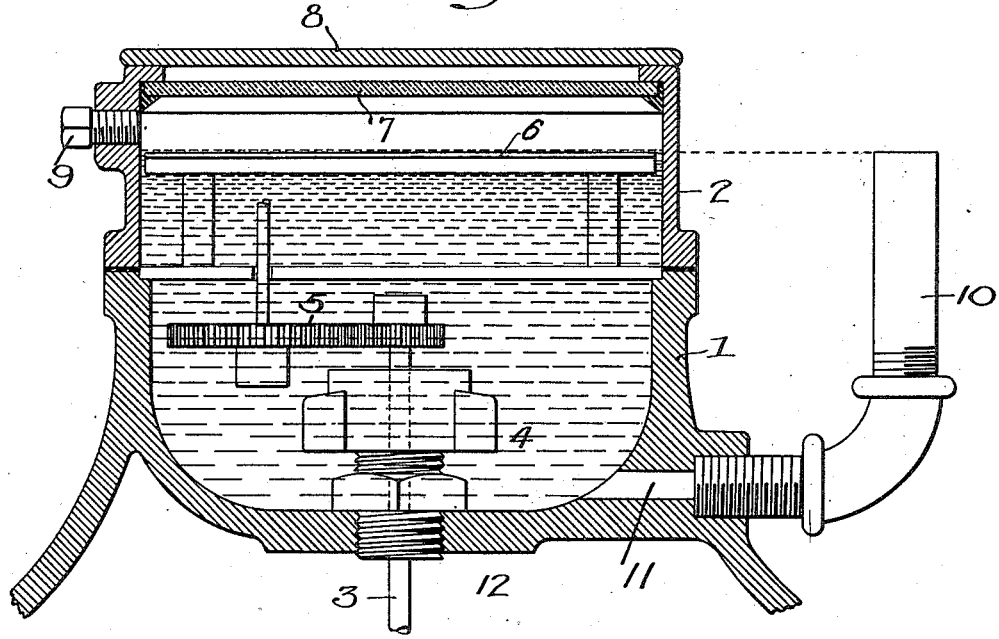
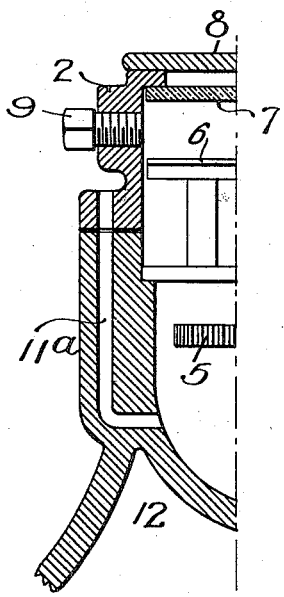
Witnesses.
William T. Nase.
Wills A. Burrowes.
Inventor.—
Lincoln Van Gilder.
by his Attorneys.
Howson & Howson

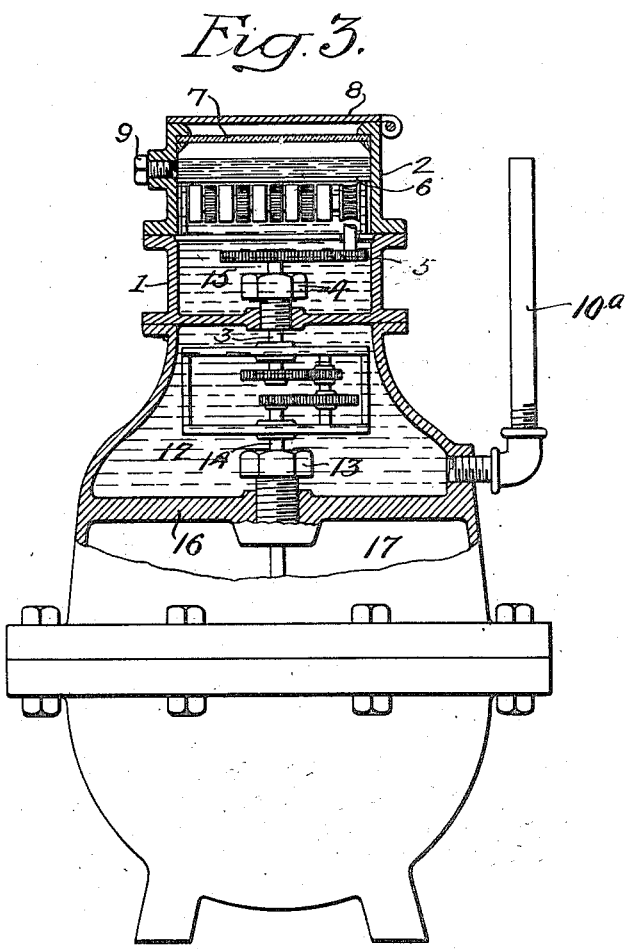

UNITED STATES PATENT OFFICE.

LINCOLN VAN GILDER, OF VENTNOR, NEW JERSEY.

WATER-METER.

1,146,674.          Specification of Letters Patent.     Patented July 13, 1915.

Application filed August 10, 1914. Serial No. 856,098.

*To all whom it may concern:*

Be it known that I, LINCOLN VAN GILDER, a citizen of the United States, residing in Ventnor, New Jersey, have invented certain Improvements in Water-Meters, of which the following is a specification.

One object of my invention is to provide a water meter of such construction and arrangement of parts that the register mechanism shall not corrode under even the most adverse conditions of use, and whose co-efficient of friction shall remain constant regardless of the moisture or corrosive gases to which the meter as a whole may be exposed.

I further desire that the meter shall be so made and equipped that the under-side of its glass face plate shall not become clouded by moisture or vapor, nor the dial plate be rendered illegible or affected by staining or corrosion; the arrangement of parts being such that the meter as a whole may be submerged in water without injury.

These objects and other advantageous ends I secure as hereinafter set forth, reference being had to the accompanying drawings, in which, Figure 1 is a vertical section of that part of the meter including the register box, showing it as constructed according to my invention; Fig. 2 is a fragmentary vertical section of a slightly modified form of the invention, and Fig. 3 is an elevation partly in section of a meter showing my invention as applied in a manner different from that shown in Fig. 1.

In carrying out my invention, I preferably construct the register casing as shown in Fig. 1, on the top of the main meter structure, and for convenience of manufacture, usually though not necessarily, make it in two parts 1 and 2, connected together in any desired manner so as to be air-tight at their point of junction.

A spindle 3 driven by the meter mechanism and passing through a stuffing box 4 into the register casing drives any suitable form of registering mechanism, part of which is indicated at 5; the dial plate being shown at 6. The part of the casing 2 is provided with a glass or other transparent plate 7 which makes an air tight joint with said part, and is provided with the ordinary protective cover plate 8. At one side it also has a filling opening normally closed by a plug 9, so that the register casing as a whole is air and liquid tight except for a pipe or conduit 10 connected to its bottom part through a passage 11, and extending upwardly so that its top terminates at a level slightly above or immediately adjacent the level of the top surface of the dial plate 6. If desired, instead of providing a separate pipe 10 in connection with the passage 11, the latter may be extended upwardly as shown at 11$^a$ within the wall structure of the casing and continued in the part 2 thereof. The casing is then filled with oil or other lubricant of a specific gravity less than that of water, and of such composition that it will not mix with water. It must also be non-corrosive, limpid at all temperatures above freezing, and preferably transparent. In filling the casing, the end of the pipe 10 is temporarily plugged or closed and said casing is laid on its side so that the oil or other liquid may be introduced through the opening ordinarily closed by the plug 9. The liquid may be used in such an amount that after the plug 9 has been replaced and the casing returned to its usual horizontal position, the liquid level is at or adjacent the top surface of the dial plate, although if desired the casing may be completely filled. Under operating conditions it will be seen that the register mechanism will naturally be perfectly lubricated as it is immersed in the liquid and is completely protected from corrosion or effects of moisture, it being obvious that if it be desired that the casing shall be completely filled with oil, the pipe 10 is extended sufficiently to bring its upper or outlet end flush with or slightly above the face plate 7.

If any water should leak into the casing along the spindle 3 through the stuffing box, it would merely collect under the oil body and find its way into the passage 11. Since such water is necessarily below the oil by reason of its specific gravity, any further quantities of water entering the casing through the stuffing box are forced into the pipe 10 and finally caused to overflow the upper end of the same without in any way disturbing or contaminating the oil in which the register mechanism is immersed. It is obvious that under these conditions there can be no collection of moisture on the under-face of the glass plate 7, nor will there be any discoloration of the dial plate such as would interfere with the convenient reading of the meter. Again by reason of the stuffing box, the oil cannot be drawn from the casing 1—2 into the main compartment of the meter by the suction action of the liquid currents in the latter, nor can any solid material enter the said casing.

With the above described arrangement of parts the casing 1—2 may be filled with oil preparatory to shipping the meter from a factory or store room and the pipe 10 or passage 11$^a$ plugged. Upon arriving at its destination and being set up for service, the removal of such plug from the pipe or passage, will permit of the above described operation, it being noted that the accumulation of any large body of water in the casing is effectually prevented since by reason of the fact that the oil is trapped in the latter such water is necessarily passed into and is discharged from the conduit formed by the pipe 10 or passage 11$^a$.

In some cases as for example where the water has a corrosive action on the mechanism of the meter, I provide means whereby all of the gearing is arranged to operate in oil and for this purpose I place a stuffing box 13, around the main spindle 14 where it passes through the partition between the chamber containing the water actuated member and the gearing of the meter. With this arrangement the vent pipe 10$^a$ leads from a point adjacent the lowest part of the gear chamber 12 to a point at or adjacent the level of the top of the dial plate 6. In the partition separating this gear chamber 12 from the register chamber 15 I may as before provide a stuffing box 4 to prevent circulation or leakage of oil between the same. Ordinarily, however, when the stuffing box 13 is employed, the stuffing box 4 would be omitted, and in any case the meter would be filled with oil above the partition 16 separating the chamber 17 containing the actuating mechanism from the gear chamber 12, so that its top surface is at a level slightly above the dial plate 6. The main gearing as well as the register mechanism proper will therefore be at all times immersed in oil and as before, any water leaking past the stuffing box 13 will necessarily be discharged through the vent pipe 10$^a$ without in any way affecting the gearing or other mechanism of the meter or disturbing the oil in the casing.

I claim:—

1. The combination in a meter of a liquid tight casing; registering mechanism in said casing; an overflow conduit extending from a point adjacent the top of the casing and opening into the bottom thereof; with a body of liquid of less specific gravity than water, in the casing.

2. The combination in a meter of a liquid tight casing having a transparent face plate; registering mechanism having a driving member extending into the casing; a stuffing box for said driving member; a conduit extending from the bottom of the casing upwardly to a point adjacent the top thereof; and a body of transparent lubricating material in the casing.

3. The combination in a meter of a main casing; a liquid tight casing mounted on the main casing, having a normally closed filling opening and a transparent face plate; an overflow conduit opening into the bottom of said second casing, and extending upwardly for a distance sufficient to bring its outlet substantially to the level of the top of said casing; a driving member extending from the main casing into said second casing; registering mechanism connected to said driving member in said casing; and a body of transparent lubricant trapped in the second casing by said overflow pipe.

4. The combination in a meter of the main casing and an auxiliary casing, the latter being provided with an overflow conduit formed in its wall, opening into its lower portion and having an outlet at a level adjacent the top of said auxiliary casing; and a body of transparent lubricating liquid trapped in the auxiliary casing by said conduit.

5. The combination in a meter of a casing; a partition dividing said casing into chambers; a driven spindle extending through said partition; a stuffing box for the spindle placed to prevent leakage through the partition; registering mechanism; gearing mounted in the chamber above the partition and operatively connecting said spindle with the registering mechanism; a body of oil filling the casing above the partition; and an overflow conduit extending from the gear containing chamber to a point at least as high as the dial of the registering mechanism.

6. The combination in a meter of a casing; partitions dividing said casing into chambers; gearing in the chamber between said partitions; registering mechanism between one of the partitions and the upper part of the casing; a driven shaft extending through the bottom partition and actuating said gearing; a second shaft passing through the second partition and connecting the gearing and the registering mechanism; stuffing boxes for the shafts in the partitions; and a body of oil filling the casing above the bottom partition.

In testimony whereof, I have signed my name to this specification in the presence of two subscribing witnesses.

LINCOLN VAN GILDER.

Witnesses:
CLARENCE KREUTZ,
CHARLES E. JACKSON.